Aug. 31, 1965 N. M. EMSLIE ETAL 3,203,076

METHOD OF CONSTRUCTING MEMORY STORAGE ARRAYS

Original Filed June 18, 1958

INVENTORS
NORMAN M. EMSLIE
SUNG Y. WONG

BY Carl H. [signature]

AGENT 3,203,076
Patented Aug. 31, 1965

3,203,076

METHOD OF CONSTRUCTING MEMORY STORAGE ARRAYS

Norman M. Emslie, Yardley, and Sung Y. Wong, Ambler, Pa., assignors to Philco Corporation, Philadelphia, Pa., a corporation of Delaware Continuation of application Ser. No. 742,852, June 18, 1958. This application Apr. 18, 1962, Ser. No. 190,522
4 Claims. (Cl. 29—155.5)

This invention relates generally to electronic data-processing equipment and more particularly to an improved method for fabricating magnetic core memory arrays associated with such equipment, the present application being a continuation of our copending application bearing Serial No. 742,852, filed June 18, 1958, now abandoned.

While of broader applicability this invention has particular utility in the construction and interconnection of random-access core memory planes such as the magnetic core memories typical employed in digital computers, and it is in this particular field of application that the concepts of the invention are illustrated and described.

As the usefulness of digital computers has expanded from the strictly computational and accounting type of problems, to problems of simulating control, and others, and with the widening demand both militarily and commercially for computers capable of handling vast quantities of information at increased rates of speed, the need for computers having greater internal storage capacity has become a practical necessity. Under the thrust of this expanding use magnetic core memories have emerged as the outstanding digital storage medium in applications requiring high-speed random-access in combination with extensive storage capacity.

With this increase in system complexity, the reliability of each component part has become of paramount significance. Particularly is this true with regard to the design, construction and interconnection of core memory planes insofar as they constitute the heart of any data-processing system. The cores, as solid state devices, are infinitely reliable after proper testing and selection, unfortunately, however, these intrinsically reliable components are no more dependable than their weakest constructional adjunct.

Conventionally the core network of a computer memory consists of a number of interconnected, individual core planes, each plane containing as many as several thousand small ferrite rings trussed in a maze of wires, each plan having its own individual frame to which the X and Y drive windings, inhibit, and sense windings are secured. Each frame is interconnected by separate fastening means to form a core memory stack. This arrangement results in a complex of individual, separate connections, an assembly which is not only expensive and time consuming to manufacture but one which requires extreme care during fabrication to insure dependability of the system.

Accordingly, it is an object of this invention to provide a unique and greatly simplified method for constructing core planes and for fastening them in a multiplane storage array.

It is another object of this invention to provide a novel method of and apparatus for constructing and assembling core memory stacks.

It is a still further object of this invention to provide a method of constructing memory storage arrays which results in an assemblage which is more compact, less costly and of inherently greater reliability.

Other objects contemplated will be more fully understood by reference to the accompanying detailed description and drawings in which.

Figures 1, 2, 3:
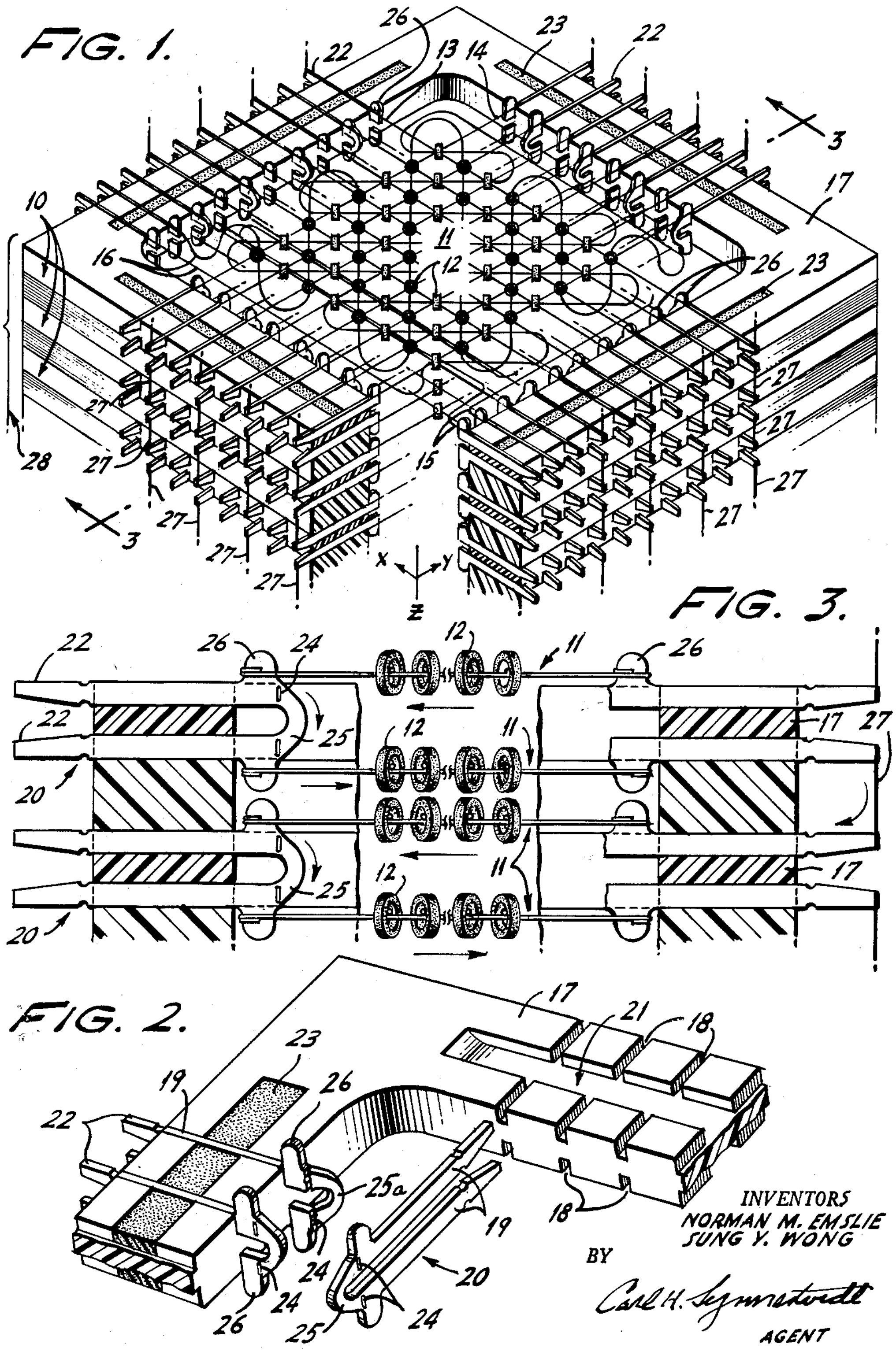
FIGURE 1 is a perspective showing, partially in section, of a core memory stack embodying the present invention.
FIGURE 2 illustrates one mode of fabricating a core module utilizing the teachings of this invention.
FIGURE 3 is a sectional view taken along the cutting plane 3—3 of FIGURE 1.

Referring to the drawing, particularly to FIGURE 1, there is shown a core memory stack comprised of a series of unique biplanar core modules 10, the individual core planes or mats 11 of each module being interconnected in particular accordance with the present invention. The core modules are conveniently maintained in spaced relation by the interposed space means 10'. To insure clarity of illustration only one core plane is completely shown in FIGURE 1, although other subjacent core planes are shown fragmentarily. Each plane comprises a matrix of molded ferrite cores 12 of the type having a substantially square hysteresis loop. A typical size for these cores is 0.080 inch outside diameter, 0.050 inch inside diameter, and 0.025 inch along the axis.

As is known in this art, information to be processed is first converted to its binary code equivalent, which information can then be conventionally placed in storage as a result of the unique bistable magnetic characteristic of each saturable core element 12. The cores when subjected to a magnetic field of appropriate strength, induced by current passing through a wire traversing the core, assume one of two possible magnetic states which are dependent upon the direction of current flow, each of the two states representing one of two elemental binary positions. The cores resulting magnetic state may be readily sensed and interpreted by means well known in the art.

In accordance with known practice, the cores are arranged in planes or matrices, the size of a plane being determined by the number of words or units of information the memory is required to store. FIGURE 1 illustrates an 8 core x 8 core matrix with a storage capacity of sixty four words or other units of information. In the scheme shown, the selection principle used for both inserting and sensing a bit of information—steps normally termed "writing" and "reading"—is known and is called coincident current selection, and comprises, in the two-coordinate system shown, the technique of passing a current of a magnitude equal to one half the value needed to switch the magnetism of a particular core, along each of two wires. The core lying at the intersection of the two energized wires is the only core in the plane receiving sufficient stimulation to result in a change in its magnetic state. After the size of the core plane has been fixed the number of core or digit planes in the memory array is determined in accordance with the number of digits required for each word of information this being dependent upon system complexity which in turn is a function, among other things, of the particular application and the number of cores or so called bits devoted to auxiliary functions such as address, instruction and error detection. Memories currently in use typically employ as many as twenty-four to forty-eight core planes per memory stack.

All cores stacked in a particular X–Z or Y–Z plane (see FIGURE 1), are interconnected, each X and Y coordinate drive winding, as for example, core windings 13 and 14, threading the corresponding cores in each subjacent core plane. This arrangement makes possible the simultaneous energization of the desired core in each plane, and in combination with the inhibit winding 15 passing through all the cores in any one plane, permits the simultaneous recording of the coded information. Memory locations are selected in any order. During each read and write operation, the desired row and column in the storage array are selected by magnetic-core selection switches not shown. Whether or not the core actually is switched is determined individually for each core or digit plane by the current in the digit-inhibit winding 15. This latter winding is individual to each core plane and passes through every core in that plane. To interrogate or extract information from the cores, a sense winding 16, again individual to each plane, is provided. Information stored in each core can be readily determined by merely passing a current, opposite in direction to that normally employed in the writing or storage operation, through windings intersecting at the core to be interrogated. This mode of interrogation either results in a flux reversal within the core or has no readable affect depending on the magnetic state of the particular core being interrogated, the resulting condition being electrically sensed by the winding 16.

A particularly advantageous feature of the present invention is that of providing a biplanar core module 10, shown in its partially fabricated state in FIGURE 2, the module shown comprising a single frame 17 supporting two core memory planes 11, the individual X and Y drive windings of each plane being appropriately interconnected, as shown in FIGURE 3, by a novel expedient hereinafter described. This type construction eliminates the need for separate frame means for each core plane, materially reduces the number of separate connections required in any multiplane memory array and affords a unique structural unit facilitating the fabrication of complex memory arrays, the module being compact, light, and of high intrinsic reliability.

One method of module fabrication (FIGURE 2) is to make the frame 17 of bakelite, laminated phenolic or other suitable insulating material and to gang-mill into each face of each side of the framing, a series of equispaced slots or grooves 18 of a depth and width adapted to receive arm portions 19 of the U-shaped or hairpin terminals or conductors 20.

The slots in each side of the framing are cut transversely by a trough or groove 21, the purpose of which will be later described. The terminals 20 are inserted into the frame slots in the manner shown in FIGURE 2, the U-shaped portion of the terminal being inwardly disposed and with the terminal portions 22 of the connector 20 extending beyond the frame edge. When positioned the terminals are locked in place by the simple expedient of encapsulating the central portion of the terminal as by pouring an epoxy resin or other cement-like material 23 into the transversely disposed grooves 21. When the material hardens the terminals are rigidly held within the frame 17. It will be seen referring to FIGURE 3, in the light of the cut section of FIGURE 1, that the drive windings are serially connected in zig-zag fashion to provide the required electrical connection between adjacent core planes 11, the conductive path between successive core planes being indicated generally by the arrows shown in FIGURE 3. To attain the advantages inherent in the mode of fabrication above described, while still maintaining the flexibility required by the overall system, the terminals 20 are scored at 24 in such manner that the conductive bridge 25 between terminal arms 19 is readily severable and can be snapped-off when desired, as shown at **25*a* in FIGURE 2, or may alternatively be left intact to provide a conductive bridge between planes thereby to provide convenient means selectively interconnecting the circuitry of adjacent core planes. FIGURE 1 shows a completed assembly, alternative terminals having the U-shaped portion removed to afford the selected series connection between core memory planes. To facilitate wiring, each connector or terminal may be provided with transversely extending projections or ears 26** to which the drive windings can be wire wrapped, dip soldered or otherwise affixed. These terminals are preferably produced in one stamping operation and can be conveniently made from brass or other suitable, conductive material.

The preferred practice in carrying out the method teachings of the invention is to provide an insulative frame carrying banks of electrically conductive terminal pairs, the terminals comprising each of said pairs being spaced in a direction transverse their length and having an integrally formed interconnecting body portion configured to facilitate its fracture and removal, and then providing for the desired electrical interconnection between superposed core planes by selective removal of body portions, followed by the securement of individual drive windings of separate core memory planes to opposed terminals of each of said terminal pairs. This practice has advantages particularly from the standpoint of accessibility.

It will be understood, however, that the sequence of steps after the provision of an insulative frame carrying banks of paired terminals is subject to variation within the scope of this invention, considered in its broader aspect.

To facilitate testing, the terminal portion 22 of each of the connectors 20 is made to project outside the frame and is shaped to mate with taper tab receptacles. This enables temporary but reliable connection to be made to any point in each plane for interim testing.

Wire strapping 27 electrically joins the individual biplanar modules 10 into a composite integrated core memory stack assembly 28, the strapping serving to interconnect corresponding drive windings in adjacent modules. In the illustrated assembly, for example, there is provided eight individual, conductive paths which start at one end of the memory, pass through all the digit core planes and terminate at the other end of the memory. For the sake of clarity a storage array of unusual simplicity has been shown. It will be appreciated, however, that many present day memory systems are considerably more complex than the one illustrated and that the advantages inhering in the present invention are of increasing importance with increasing system complexity.

While preferred practice, illustrative of the method concepts of the present invention has been depicted and described, it will be understood by those skilled in the art that the invention is susceptible to changes and modifications without departing from the essential concepts thereof and that such changes and modifications are contemplated as come within the scope of the appended claims.

We claim:

1. In the fabrication of a multiplane core storage array consisting of a single frame supporting two core memory planes one adjacent either face of said frame, the steps which comprise: providing a generally flat, insulative frame; securing to said frame, at spaced intervals around its perimeter a plurality of electrically-conductive terminal pairs the terminals of each pair being interconnected by a common body portion; orienting opposed terminals of each terminal pair in spaced relation transverse the plane of said frame in such manner that each terminal pair has a terminal positioned in each of said two core memory planes; securing individual drive windings of said two core memory planes to opposed terminals of said terminal pairs; and providing the desired electrical circuit between superposed core planes by selective removal of body portions of appropriate terminal pairs.

2. In the fabrication of a multiplane core storage array consisting of a single frame supporting two core memory planes one adjacent either face of said frame, the steps which comprise: providing a generally flat, insulative frame; securing to said frame, at spaced intervals around its perimeter a plurality of electrically-conductive terminal pairs, the terminals comprising each pair being interconnected by a common body portion and disposed in spaced relation transverse the plane of said frame in such manner that each terminal pair has a terminal positioned in each of said two core memory planes; securing individual drive windings of one core memory plane to one set of terminals of each of said terminal pairs, and individual drive windings of said second core memory plane to an opposite set of terminals of each of said terminal pairs; and providing the desired electrical circuit between said core planes by selective removal of body portions of appropriate terminal pairs.

3. In the fabrication of a multiple core storage array consisting of a single frame supporting two core memory planes one adjacent either face of said frame, the steps which comprise: providing a generally flat, insulative frame constructed and arranged to support a double plane core storage array; securing to said frame, at spaced intervals around its perimeter, a plurality of electrically conductive terminals arranged in terminal pairs, the terminals of each pair being interconnected by an integrally formed body portion configured to facilitate its fracture and removal; disposing opposed terminals of each terminal pair in spaced relation transverse the plane of said frame in such manner that each terminal pair has a terminal positioned in each of said two core memory planes; securing individual drive windings of individual, superposed core memory planes respectively to opposed terminals of said terminal pairs; and providing the desired electrical circuit between said superposed core planes by selective removal of body portions of appropriate terminal pairs.

4. In the fabrication of a multiplane core storage array consisting of a single frame supporting two core memory planes one adjacent either face of said frame, the steps which comprise: providing a generally flat, insulative frame; securing to said frame, at spaced intervals around its perimeter, a plurality of paired, electrically conductive terminals, the terminals comprising each pair having an integrally formed interconnecting body portion; disposing opposed terminals of each terminal pair in spaced relation transverse the plane of said frame in such manner that each terminal pair has a terminal positioned in each of said two core memory planes; attaching individual drive windings of said core memory planes to opposed terminals of said terminal pairs; and providing the desired electrical circuit between said superposed core planes by selective removal of body portions of appropriate terminal pairs.

References Cited by the Examiner

UNITED STATES PATENTS

| | | | |
|---|---|---|---|
| 1,478,786 | 12/23 | Hazelett | 29—418 |
| 2,784,391 | 3/57 | Rajchman et al. | 29—155.5 |
| 2,870,532 | 1/59 | Young | 29—155.55 |
| 2,871,551 | 2/59 | Harris | 29—155.55 |
| 2,926,340 | 2/60 | Blain et al. | 340—174 |
| 2,944,329 | 7/60 | MacKay | 29—155.55 |
| 3,017,615 | 1/62 | Smith et al. | 29—155.5 |
| 3,075,184 | 1/63 | Warman et al. | 340—174 |

WHITMORE A. WILTZ, *Primary Examiner.*

JOHN F. CAMPBELL, *Examiner.*